United States Patent Office 3,006,146
Patented Oct. 31, 1961

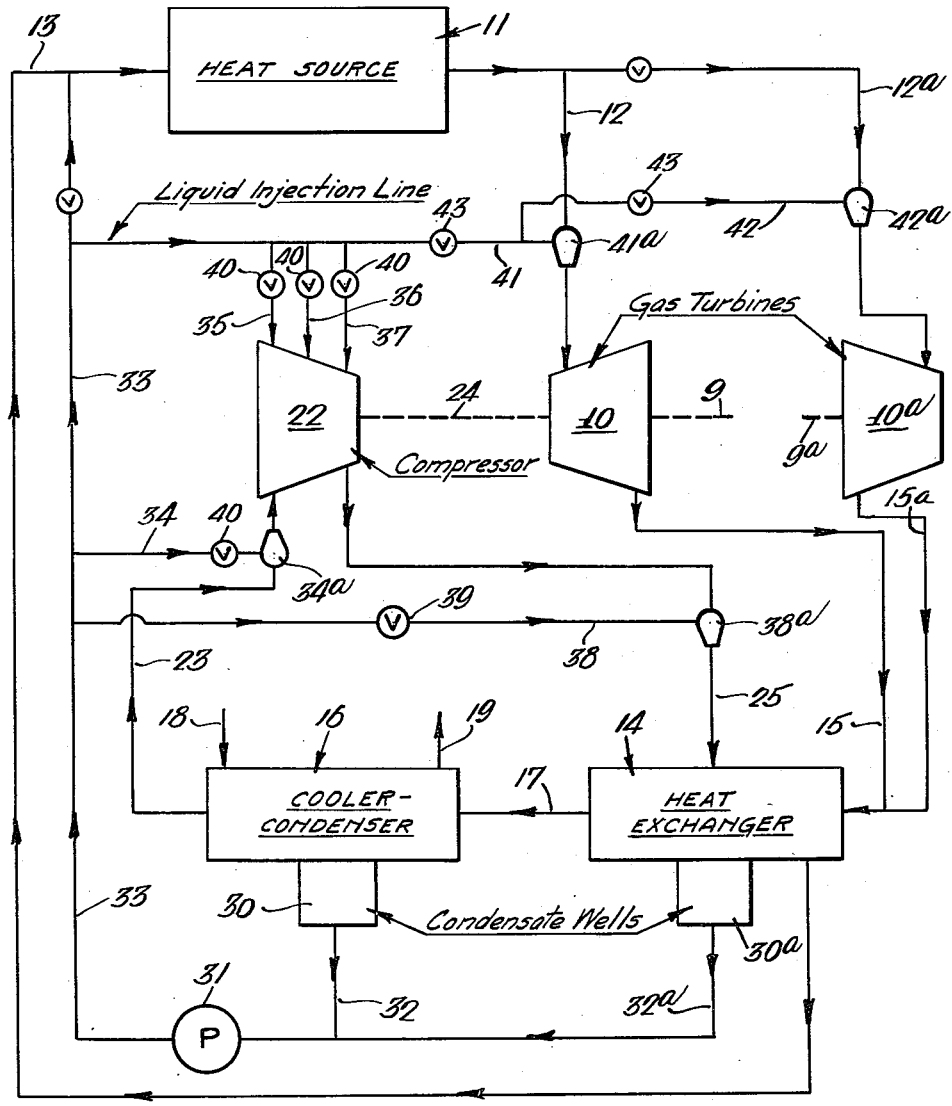

3,006,146
CLOSED-CYCLE POWER PLANT
Francis L. Jackson, Media, Pa., assignor to The Franklin Institute, Philadelphia, Pa., a corporation of Pennsylvania
Filed Sept. 19, 1958, Ser. No. 762,134
7 Claims. (Cl. 60—40)

The present invention relates to a mixed-fluid, closed-cycle power plant. The power plant may utilize any heat source, but the invention has particular application to power plants employing a nuclear reactor as the primary heat source, a gas turbine as the power means, a heat exchanger, and a compressor.

The present invention increases the work ratio by markedly reducing the power requirements for gas compression which, in turn, also materially reduces the necessary turbine power and also provides increased efficiency. This is accomplished by introducing into the gas a quantity of water or other suitable liquid with optimum vapor phase relation. The liquid added is a preselected fraction of a total flow of the working fluid, and the fraction may be varied and optimized to provide the benefits set forth hereinafter.

With the foregoing in mind, a primary object of the present invention is to substantially increase the ratio of useful power output with respect to the power of the turbine by means of a parallel and subsequently mixed closed circuit, using a gas combined with a liquid and/or liquid-vapor substance, providing also an increase in thermal efficiency.

Another object of the invention is to reduce the power and size of the gas compressor by pumping the liquid-vapor substance in its liquid form for subsequent injection to a substantial extent beyond the compressor, thus reducing the power required to drive the compressor with a consequent reduction in the power demand of the turbine to obtain a desired output power.

The injection or mixing of the liquid, such as water, provides considerable heat capacity per unit flow in subsequent heating for the heat source and expansion through the turbine, thus reducing the necessary flow rate. It also provides useful heat transfer in partial or full condensation of the liquid-vapor substance from vapor to liquid form in the heat exchanger and condensor.

Another important object of the present invention is to improve the part load operation of the power plant by maintaining the gas compressor at its full load optimum operating point (i.e., at its maximum efficiency) and reducing the load by reduction of the liquid flow component only. The optimum point of the turbine may be maintained at reduced flow rates by the use of two separate turbines, cutting out one for extreme part loads, or by stage operation with a single turbine. Thus, the compressor is maintained at its full rate, and the output is controlled by controlling the liquid injection.

The present invention also provides for effective variation in loading by the use of liquid control valves which controls the liquid flow injection and modulates the net output. In accordance with the invention, additional control may be effected by recirculating a portion of the gas and/or varying the pressure of the circuit to maintain the compressor at optimum operating point.

The present invention also improves the efficiency of a closed-cycle system by improving the heat transfer characteristics on heat exchanger surfaces, thereby permitting the use of smaller heat exchangers and piping in the system.

The invention, when embodied in any closed-cycle system, provides a simple means to change in a predetermined manner the mass flow of the water and hence the operating characteristics of the plant.

When employed with a nuclear reactor as a heat source, the invention provides a simple means of changing, in addition to the mass flow, the moderation and hence the reactivity of the reactor.

The present invention, by making use of a second working fluid, for example water, which is capable of being evaporated, condensed at convenient temperatures, avoids unnecessary work of compression and delivery and thereby delivers more of the reactor energy as useful work at the output shaft of the turbine.

All of the objects of the present invention and the various features and details of the construction, arrangement, and operation thereof, are more fully set forth hereinafter with reference to the accompanying drawing, illustrating a preferred embodiment of the invention, wherein:

The figure is a schematic diagram of a closed-cycle gas system embodying the present invention.

Referring to the system disclosed in the drawing, the power output of the power plant, for example indicated by the broken lines 9 and 9a, is supplied by turbines 10 and 10a driven in tandem by heater 11, in the present instance a nuclear reactor. The gas is supplied to the reactor 11 by a supply line 13 from a preheater or heat exchanger 14. The heat exchange fluid for preheating the gas in the line 13 is the exhaust gas from the turbines 10 and 10a, supplied through the lines 15 and 15a. The exhaust gases from the lines 15 and 15a lose a substantial part of their heat content in the heat exchanger 14 and are further cooled in a cooler 16 connected to the heat exchanger 14 by a line 17. The coolant for the cooler 16 may be any available low temperature medium which is introduced into the cooler and discharged as indicated by the arrows 18 and 19 respectively. The cooled gases are then directed to a compressor 22, for example through the line 23. In the present instance, the compressor 22 is driven from the turbine 10 as indicated by the broken line 24 and operates to pressurize the gases which are then fed to the heat exchanger 14 through the line 25. The compressed gases are preheated in the exchanger 14 and are passed into the supply line 13 to the reactor to complete the closed cycle.

While a two-shaft arrangement is shown in the schematic figure, a single or other multiple shaft arrangement could be utilized. For better part load performance, it is preferred to use a multiple shaft arrangement so that a selected turbine may be shut down when operating at part load.

In accordance with the invention, means is provided to inject liquid, for example, water, which has a boiling point substantially higher than the boiling point of the gas into the gas system whereby the water is recirculated through the system concurrently with the gas. The water is injected, preferably in atomized liquid form, into the gas circulating through the heat exchanger 14 and passing to the reactor 11 through the supply line 13. After passage through the reactor 11, the water in the gas is in the form of superheated steam and the dry vapor cooperates with the gas to drive the turbines and is discharged to the heat exchanger 14 where it gives up heat to the mixture of gas and atomized liquid passing through the heat exchanger 14 toward the reactor 11. The discharged mixture of gas and water than passes to the heat exchanger 14 and cooler 16 which condense out the liquid water from the gas and collect the water in reservoirs. From the reservoirs, the liquid is introduced back into the gas stream where it is recycled.

In the illustrated embodiment of the invention, the heat exchanger 14 and the cooler 16 are provided with condensate wells 30 and 30a which serve as reservoirs for collecting the water condensed from the gas stream in the cooler. The condensate wells are connected to the intake of a pump 31 by means of conduits 32 and 32a, and the pump 31 pumps the water into the gas line by means of an outlet conduit 33. As shown in the drawing, a branch conduit 34 is connected to the gas line 23 leading from the cooler to the compressor at the point 34a. The connection at 34a comprises an injector for introducing the water into the gas stream in atomized liquid form. The injector means may comprise any suitable device which operates to introduce the atomized liquid into the gas system without introduction of atmospheric air or substantial loss of the gas or liquid in the atmosphere.

The conduit 33 also is provided with additional branch conduits 35, 36, and 37 which are connected to suitable injector means within the compressor for injecting atomized liquid water into stages of the compressor. In certain installations, one or more of the conduits 34 to 37 inclusive may be closed off and valves 40 may be provided to regulate the quantity of water injected into the system. By regulating the amount of water, the flow rate is varied to control the power output of the turbines. The gas flow rate is maintained substantially constant at the optimum flow rate for the compressor. If desired, the flow rate of the gas with respect to that of the liquid through the turbines and the heat exchanger may be controlled by suitable bypasses.

Means is provided to introduce liquid water into the line 25 leading from the compressor to the heat exchanger 14. To this end, a branch conduit 38 is connected to the line 25 as indicated at 38a. The connection at 38a comprises a suitable injector similar to the injector at 34a. A valve is provided at 39 to selectively regulate the flow of liquid water into the injector means 38a. By reason of this arrangement, the gas entering the heat exchanger 14 from the compressor has a high liquid water content. The moisture in the gas increases its thermal conductivity and increases considerably the film heat transfer coefficient. The moisture-laden gases entering the heat exchanger 14 are preheated and a certain amount of the moisture is evaporated and converted to vapor. Depending upon the amount of liquid water injected into the gas system, the vapor in the gas leaving the preheater 14 may be superheated or saturated, according to the heat transfer in the preheater 14.

The gas-vapor mixture leaving the preheater 14 travels through the line 13 to the reactor 11 where the vapor is superheated to a substantial extent. By introducing liquid water before the regenerator, for instance via inlet 38a, so that it is evaporated by heat, and then superheating it in the reactor, the supply of elastic working fluid to the turbine is substantially increased, without imposing any corresponding load on the compressor. The greater part of the improved work ratio, improved thermal efficiency, and reduction of compressor size must be credited to the gain in mass of working fluid via 38a.

If desired, the water may be injected in the lines 12 and 12a, for example by the lines 41 and 42 and injectors 41a and 42a. The supply of liquid is controlled by a valve 43.

By expanding the working fluid in the turbine, and then using much of the remaining heat from the turbine exhaust in the counterflow heat exchanger to dry the working fluid which is about to enter the heat source, the turbine may operate dry, while the regenerator may operate wet on both sides of its heat-exchange surface. The heat exchanger area will be minimized. It is clear that the cycle outlined here combines the advantages of gas cooled reactor plants with the high thermal performance of a superheated steam cycle.

The controlled injection of liquid provides a simple means to change the operating characteristics by changing the mass flow of the liquid. In addition, apart from the increased efficiency of the gas system, the presence of accurately regulatable quantities of liquid in the reactor permits regulation of the moderation and hence reactivity of the reactor. By introducing the controlled injection of a secondary coolant medium to mix with the main reactor coolant, the effectiveness of moderation—and hence the reactivity—may be varied. By altering the relative proportions of the two coolant components, a desired change in reactivity can be produced. The coolant mediums employed may be $D_2O$ and $H_2O$ or any combination of coolants.

While varying the liquid injection, the compressor may continuously operate at full load at its peak efficiency.

In its passage through the turbines 10, the gas-vapor mixture is cooled and expanded to a substantial extent, and the vapor loses all or a substantial portion of its superheat. Thus, the gas passing through the heat exchanger 14 has a certain degree of moisture in it which greatly enhances the heat exchange characteristics in the heat exchanger 14, thereby increasing the efficiency of the system. In the subsequent cooling operation, the moisture in the gas is condensed and collected in the reservoirs for injection into the gas flow.

While a particular embodiment of the present invention has been herein illustrated and described, changes and modifications may be made. For example, the pump 31 need not be a mechanically driven pump, but the pumping action may be accomplished by other means. While the invention has been particularly described in connection with a nuclear reactor, it is apparent that other heat sources may be employed within the scope of the invention. Likewise, a relatively simple double shaft cycle has been illustrated, but single shaft and other multi-shaft cycles may be employed within the scope of the invention, as defined in the appended claims. Furthermore, reheat stages obviously might be added to the turbine to increase its expansion ratio without excessive erosion caused by liquid water. While water, either heavy or light, has been spoken of, any fluid having convenient thermodynamic properties might be used in its place. The term "gas," as used in the specification and claims, includes any gaseous fluid, whether it is a pure gas or a mixture of gases, which remains in its gaseous state throughout the normal operating range of temperatures and pressures in the closed-cycle system.

I claim:
1. The method of improving a closed-cycle power system having a power means which expands, cools, and discharges a compressed heated gaseous fluid, said system passing the discharged gaseous fluid back to said power means after cooling, recompressing, and heating the same, said method comprising the steps of injecting a liquid having a boiling point substantially higher than the boiling point of the gaseous fluid into the compressed gaseous fluid prior to its passage into said power means, converting said liquid into dry vapor to constitute said fluid a mixed fluid, condensing substantially all of said dry vapor after its discharge from the power means simultaneously with the cooling of the gaseous fluid, and collecting said condensed liquid for reinjecting the same into the gaseous fluid whereby said liquid is recycled through the system.

2. The method according to claim 1 wherein said liquid is injected into the gaseous fluid after it has been heated and before it passes into said power means.

3. The method according to claim 1 wherein said liquid is injected into the gaseous fluid after it is compressed and before it is heated.

4. The method according to claim 1 wherein said liquid is injected into the gaseous fluid at more than one location in the cycle.

5. Method according to claim 1 wherein control of the power plant is effected by changing the ratio of the injected liquid to the gaseous fluid, and changing the total mass flow.

6. Method according to claim 5 wherein the flow of the gaseous fluid through the compressor is maintained substantially constant.

7. The method according to claim 5 wherein the heating is effected by a nuclear reactor, the gaseous fluid constituting the primary coolant of the reactor and the liquid constituting a secondary coolant, the changing of the ratio being effected before the gaseous fluid has been heated by said reactor, to thereby change the moderation and hence the reactivity of said reactor.

References Cited in the file of this patent

UNITED STATES PATENTS

| | | |
|---|---|---|
| 2,454,358 | Traupel | Nov. 23, 1948 |
| 2,469,679 | Wyman | May 10, 1949 |
| 2,549,819 | Kane | Apr. 24, 1951 |
| 2,642,721 | Mallinson | June 23, 1953 |
| 2,825,688 | Vernon | Mar. 4, 1958 |

FOREIGN PATENTS

| | | |
|---|---|---|
| 931,655 | Germany | Aug. 16, 1955 |